United States Patent Office 2,833,753
Patented May 6, 1958

2,833,753
POLYMERIZATION CATALYST FOR ACRYLIC MONOMERS

Joginder Lal, Cuyahoga Falls, Ohio, assignor to H. D. Justi & Son, Inc., Philadelphia, Pa., a corporation of Pennsylvania No Drawing. Application October 13, 1955
Serial No. 540,322

12 Claims. (Cl. 260—89.5)

This invention relates to new catalysts or accelerators for polymerizing acrylic monomers and to polymerization processes carried out in the presence of the new polymerization accelerators.

More particularly, this invention is concerned with the utilization of mixtures or of preformed salts of saccharin (O-benzoic sulfimide) and certain other acids and tertiary N,N-dialkyl aryl amines, especially those which have electron donating groups such as alkyl, alkoxy, aryloxy, etc. on the aromatic nucleus, as new polymerization catalysts for the preparation of polymers from acrylic monomers.

Aromatic amines have hitherto been found to be inhibitors of polymerization when present in solutions of unsaturated ethylene resins vinyl or allyl monomers. Many patents in the art mention these amines as poisons or anticatalysts in the polymerization of reactive unsaturated monomers of this type and usually mention the aromatic amines as one of a group of preferred inhibitors for polymerization.

Salts of saccharin and amines have been described in U. S. Patent 2,538,645 as vasoconstrictor compounds. The amines used in this patent are not the amines which form salts having the polymerization catalyst activity of the invention. Similarly, amine salts of N'-acyl sulfanilamide as vasoconstrictors have been described in U. S. 2,540,786, but these likewise are not catalytically effective.

It is therefore surprising and unexpected that when appropriate amounts of saccharin and N,N-dialkyl or dialkylol amines are added to an acrylic ester such as methyl methacrylate, the resulting solution undergoes rapid polymerization. Polymerization takes place at room temperature in a much shorter time than if the monomer were polymerized by heating to elevated temperatures in the absence of the said saccharine and N,N-dimethyl aniline. Further, polymerization of methyl methacrylate does not take place if either saccharin is used alone or dimethyl aniline is used alone.

An object of my invention is to provide a new series of polymerization catalysts and accelerators for the polymerization of acrylic monomers, acrylonitrile monomers and methacrylonitrile monomers, each alone or in admixture with each other.

Another object of this invention is to provide a process for producing polymers of acrylic esters, acrylonitrile and methacrylonitrile monomers without the necessity of the external application of heat.

Another object of this invention is to reduce considerably the time in carrying out the polymerization reaction.

Preformed salts of saccharin with tertiary aromatic amines are prepared by reacting saccharin and tertiary aromatic amine in equimolecular proportion in methanol, acetone or methyl ethyl ketone. The salts crystallized well on cooling. The salts are readily characterized by analyses, molecular weight data and melting points.

The concentration of the saccharin-amine salt or mixture which is employed is small and may vary from 0.1 mole percent to 5.0 mole percent of the monomer. However, concentrations varying from 0.5 to 1.5 mole percent of monomer are preferred in order that the catalyst not be wasted.

An investigation of the rate of polymerization of methyl methacrylate by the salt or equimolar mixture of N,N-dimethyl-aniline taken as an exemplary amine, and saccharin showed that at low conversions the amount of polymer obtained was proportional to the time of polymerization. Furthermore, the equimolecular mixture of saccharin and N,N-dimethylaniline, an exemplary amine, proved to be a superior catalyst to the corresponding salt for bringing about the polymerization of methyl methacrylate. This is also true of mixtures of all other tertiary aromatic amines with saccharin.

In general, only aromatic tertiary amines in admixture with saccharin brought about the polymerization of methyl methacrylate; aromatic primary and secondary amines, namely, aniline and N-methyl-aniline when used with saccharin do not bring about polymerization. Polymerization also does not occur when a non-aromatic tertiary amine, such tri-n-butylamine, N,N-dimethylbenzyl amine, quinoline, N-methyl morpholine or N,N-diethylcyclohexylamine was used.

A p-substituent group on N,N-dimethylaniline or N,N-diethylaniline has a significant influence upon polymerization. It appears that electron donating groups such as methyl or methoxy increase the total yield of the polymer while electron withdrawing groups, namely, chloro, bromo or aldehyde reduce the yield of the polymer. When electron withdrawing groups, namely, nitro, nitroso or phenylazo were present in the para position of dimethylaniline no polymer was obtained.

Replacement of methyl groups of dimethylaniline by ethyl or propyl groups resulted in lower yields of the polymer. Substitution of methyl groups by ethyl groups in p-bromo-N,N-dimethylaniline gave similar results. Presence of methyl group in the meta position in dimethylaniline enhanced the yield of the polymer. Substitution of methyl groups in the ortho position in dimethylaniline significantly reduced the yield of the polymer, probably due to steric influence.

In order to investigate whether this new catalytic action on the polymerization of methyl methacrylate was characteristic of saccharin-amine mixture only or was a more general phenomenon, mixtures of dimethylaniline and acids, in particular carboxylic acids, were studied. 0.0015 mole each of dimethylaniline, an exemplary amine, and acid was used for polymerizing 10 ml. of methyl methacrylate. The results indicate as shown in Table V that a number of acids such as mercapto-acetic acid, phenoxy acetic acid, monochloro, dichlor and trichlor acetic acids, homologues of these acids and 2,4 dichlor benzoic acid or its homologues in admixture with dimethylaniline successfully polymerized methyl methacrylate. The stronger the acid the greater was the yield of the polymer. A significant feature was that the yields were considerably lower than in the case when a mixture of dimethylaniline and saccharin was employed. Molecular weights of the polymers were fairly high except in the case of mercaptoacetic acid where the extremely low value of molecular weight was due to the strong chain transfer action of the mercapto group.

The polymerization of methyl methacrylate by the mixture of dimethylaniline and saccharin is inhibited by hydroquinone.

The effect of varying the concentration of saccharin in the dimethylaniline-saccharin mixture on the polymerization of methyl methacrylate was determined and it was found that the ratio of mole fraction of saccharin to that of amine may be varied between about 0.8 to about 1.3. The data shows that the higher the concentration of saccharin the greater was the yield of the polymer. The molecular weights of the polymers in the series using 0.0010 mole of amine were determined and were all practically of the same value from 440,000 to 320,000.

Similarly, the effect of varying the concentration of dimethylaniline in the dimethylaniline-saccharin mixture on the polymerization of methyl methacrylate was determined and it was found that the ratio of mole fraction of the amine to that of saccharin may be varied from about 0.8 to 1.3. The results indicate that there is an increase in the amount of the polymers as the ratio of amine to saccharin was increased from 0.8 to 1.0. Above this value, the amount of the polymer obtained tends to remain constant.

In carrying out the polymerization of acrylic ester monomers with the saccharin-amine salts, according to the present invention, a polymeric material may be incorporated in the monomer. The quantity of the polymer employed may be small enough to give a complete solution in the monomer or it may be large enough to form a slurry with the monomer without encountering any untoward mass effect.

The slurry polymerizes in a short time at room temperature to give a hard solid methacrylate polymer mass. If it is desired to accelerate the rate of the polymerization of the slurry still further, a small amount of a peroxide catalyst, for instance 0.01 mole percent of benzoyl peroxide calculated on the weight of the monomer in the slurry may be added, but for many purposes this may not be necessary or desired.

When a small quantity of a peroxide catalyst such as benzoyl peroxide is used in conjunction with the saccharin-dialkyl N-aromatic amine mixture or salt, the amount of accelerating peroxide is found to be smaller than in the absence of the combination of saccharin and the tertiary aromatic amine, but the peroxide addition is not essential in producing polymers from the monomers. Accordingly, another advantage of my invention is to considerably reduce the quantity of peroxide catalyst required to bring about the polymerization reaction, and thereby reduce the inherent danger in handling the usual large quantities of the unstable peroxide catalysts employed in polymerization reactions.

A similar acceleration in polymerization may be noted using oxygenated or aerated acrylate or methacrylate monomer from which the stabilizer is removed.

The polymerization of acrylic ester monomers with saccharin-aromatic amine salt or salt mixtures may be carried out under an inert atmosphere such as nitrogen, helium, etc. or in a sealed tube or in bulk in an open vessel in the presence of plasticizers or in the presence of the pre-formed polymers or copolymers of acrylic, vinyl and styrene resins or with mixture of monomers or with these in the presence of an inert solvent such as an organic hydrocarbon solvent to provide desirable and useful polymeric products.

Likewise, using the new catalysts of the invention polymerization procedures may be carried out in aqueous suspension or dispersion to produce finely divided polymer particles, beads or pearls, said process being carried out in the manner known for acrylic and vinyl polymers.

Small amounts of a suitable plasticizer added to the monomer impart flexibility to the final mass. The various plasticizers which may be used beneficially are, for example, dibutyl phthalate, diethyl adipate, di (2-ethylhexyl) hexahydrophthalate, dipropylene glycol dibenzoate, diisooctyl sebacate, tricresyl phosphate, polyethylene glycol di (2-ethylhexoate), etc. About 5–20 percent of the plasticizer improves flexibility and compatibility of the monomer and polymer in slurries.

Pigments ($TiO_2$, carbon black, iron oxide, etc.) in amounts of 0.1–1.0% dispersed in the monomer or in the resin produce permanent shades useful as denture materials since they can be made to simulate tooth or oral tissue.

The amines whose mixtures with saccharin, or the named lower carboxy acids, are useful as catalysts or accelerators in the polymerization reaction in accordance with my invention have the general formula:

where A is a carbocyclic aromatic nucleus of the group consisting of phenyl and naphthyl radicals; $R_1$ is radical from the group consisting of alkyl or hydroxalkyl; $R_2$ is a radical selected from the group consisting of alkyl and hydroxy-alkyl; $R_3$ is a radical selected from the group consisting of hydrogen, lower alkyl and lower alkoxy and N is nitrogen. The preferred position of $R_3$ is para with respect to nitrogen. The preferred group of compounds are those in which $R_1$, $R_2$ and $R_3$ are lower alkyl groups such as methyl, ethyl, propyl or butyl. It should be understood that $R_1$ and $R_2$ can be similar or dissimilar.

Although tertiary aromatic amines of the benzene series form crystalline salts with saccharin in good yield which can be readily purified by recrystallization, the salts of saccharin and tertiary naphthylamines cannot be readily crystallized and purified in spite of the indications that salts are formed on the basis of solubility behavior and other criteria.

When the amine nitrogen of the tertiary aromatic amine is substituted with two hydroxy-alkyl groups, suitable crystallization of the salt from the mixture is likewise difficult to attain. Nevertheless, the di-hydroxy alkyl-substituted tertiary amines in both the benzene and naphthalene series with admixture of 0.8–1.3 moles of saccharin per mole of amine produces a significant catalytic enhancement of polymerization in accordance with the invention.

Saccharin salts of quinoline or N,N-dimethyl-cyclohexylamine failed to produce any polymer. Attempts to isolate well defined salts of saccharin and p-bromo-N,N-dimethyl-aniline, p-nitro-N,N-dimethylaniline or p-dimethylaminobenzaldehyde were unsuccessful, suggesting that the derivatives of N,N-dimethyl-aniline having electron withdrawing groups in the para position resist salt formation with saccharin.

Saccharin salts are noted with N,N-dimethyl-2-naphthylamine which is typical of nitrogen di-substituted tertiary naphthalene amines, the naphthalene amines being two amino naphthalenes substituted on the amino nitrogen with a lower alkyl or lower alkyl group such as methyl, ethyl, propyl, isopropyl or isobutyl or with hydroxy alkyl groups in which the lower alkyl containing from 1 to 4 carbon atoms. Such naphthalenes may be substituted in the 4 or 7 position with lower alkyl or lower hydroxy alkyl groups also without preventing the salt formation with saccharin and producing a suitable catalytic activity for acrylic polymerization. In contrast to such substituted naphthylamines, the saccharin salt of dimethyl-1-naphthylamine is not formed but the mixture is effective in a catalyst.

Small amounts of a suitable cross-linking material may be added to impart higher heat resistance and solvent resistance to the resin. The various cross-linking agents which may be used are: divinyl benzene, ethylene glycol dimethacrylate, tetramethylene glycol dimethacrylate, diethyleneglycol dimethacrylate, glyceryl triacrylate, allyl methacrylate, diallyl maleate, diallyl phthalate, diallyl itaconate, etc. When added to the polymermonomer composition about 5–15 percent of the cross-linking agent reduces the cold flow of the resin, and increases its heat resistance and solvent resistance.

The addition of 5–40 percent of a reinforcing filler to the polymer-monomer compositions of the invention improves the working properties, reduces the coefficient of thermal expansion and imparts greater mechanical strength to the resin. A water impervious filler material, such as glass fibre, is particularly desirable. Reinforcement may be obtained from powdered fillers such as calcium carbonate, magnesium carbonate, calcium phosphate, silica, alumina, clays, feldspar, etc. Preferred, however, are high strength chopped fibre fillers such as polyvinyl chloride fibre, glass fibre, Saran (vinylidene chloride polymers) fibre, nylon fibre, high strength water repellent rayon fibre and other stretch oriented synthetic fibre materials. Smaller amounts of these fibers may be used than powdered fillers to produce equal or better abrasion resistance of the product without introducing undesirable discoloration of the restoration. Fibres of glass or stretch oriented synthetic fibres may be used in lengths from about 0.02 inch to about 0.25 inch, in diameters from about 0.00005 inch to about 0.001 inch and in amounts of about 2%–20.0% by weight of the monomer-polymer mixture. Combinations of fibres and or fillers may be used in appropriate amounts but preferably not in excess.

The following examples will illustrate the catalytic and accelerating effect of the salts of saccharin and tertiary aromatic amines and the manner in which they are incorporated for polymerizing acrylic esters in bulk or for polymerizing polymer-monomer slurries. It is to be understood that these examples are set forth for the purpose of illustration only and are not intended to be limiting of the invention.

EXAMPLE 1

To 50 ml. of methyl ethyl ketone was added 13.5 g. of N,N-dimethyl-p-toluidine and 18.3 g. of o-benzoic sulfimide (saccharin). The contents were gently warmed over a water bath for 5 minutes. On cooling, the salt of saccharin and N,N-dimethyl-p-toluidine crystallized out. The mother liquor was concentrated and a further crop of crystalline product obtained. The total yield was above 90 percent. The product was purified by crystallizing from methanol twice to give colorless material having a melting point of 121–122° C.

The saccharin amine salts prepared as above are summarized in Table I.

The saccharin amine salts are quite soluble in water and also soluble in acrylic monomers such as methyl methacrylate, ethyl acrylate, acrylonitrile, and acrylic acid. The salt is sparingly soluble in styrene and substituted styrene monomers.

Methyl methacrylate substantially free from peroxides by successively washing with dilute solutions of sodium nitrite, sodium bisulfite and sodium hydroxide according to the procedure of Fox and Loshack. After thoroughly washing with water it was dried over anhydrous sodium sulfate and distilled under reduced pressure in an atmosphere of nitrogen. The middle fraction was used in all of the polymerization examples unless otherwise specified.

Polymerizations were carried out in duplicate for one hour in a water bath maintained at 60° C. and in an atmosphere of nitrogen. 10 ml. of methyl methacrylate was used in each case. 0.0010 mole or 0.0015 mole of the salt or the binary mixture under examination was employed as catalyst. The salt or the mixture was completely soluble in the monomer, unless indicated otherwise.

The formed polymer was precipitated in 300 ml. of methanol. It was dissolved in 50 ml. of acetone and reprecipitated in 300 ml. of methanol. The polymer was dried to a constant weight in a vacuum oven. The average of two values has been presented in the data. In general, in any given series of runs the data was reproducible within the limits of experimental error.

EXAMPLE 2

To 10 ml. of purified methyl methacrylate in a test tube was added 0.318 g. of the salt of dimethyl-p-toluidine and saccharin. The tube was cooled in Dry Ice and carefully sealed. It was suspended in a water bath maintained at 60° C. After one hour, the tube was removed, cooled in Dry Ice and carefully opened. The viscous solution was precipitated in 300 ml. of methanol. The precipitated polymer was filtered and dried in vacuum and weighed 2.1 grams.

EXAMPLE 3

The experiment in Example 2 was repeated by using 0.304 g. of the salt of dimethylaniline and saccharin. The dried polymer weighed 0.7 gram.

EXAMPLE 4

The example in Example 2 was repeated using 0.318 g. of the salt of dimethyl-m-toluidine and saccharin. The dried polymer weighed 1.4 grams.

EXAMPLE 5

To 10 ml. of methyl methacrylate in a test tube was added 0.318 g. of the salt of dimethyl-p-toluidine and saccharin. The tube was sealed in the conventional way and was allowed to stand at room temperature for 8 hours. The monomer was found to have undergone almost complete polymerization at the end of 8 hours.

EXAMPLE 6

The experiment in Example 5 was repeated using ethyl methacrylate instead of methyl methacrylate. On standing overnight, almost fully polymerized mass was obtained and was essentially bubble free.

Table I

MELTING POINTS* AND ANALYTICAL DATA** FOR AMINE-SACCHARIN SALTS

| No. | Name of amine in amine-saccharin salt | M. P. of salt, ° C. | Mol. formula | Percent Carbon | | Percent Hydrogen | | Percent Nitrogen | | Percent Sulfur | |
|---|---|---|---|---|---|---|---|---|---|---|---|
| | | | | Calc'd | Found | Calc'd | Found | Calc'd | Found | Calc'd | Found |
| 1 | N,N-Dimethylaniline | 126–127 | $C_{15}H_{16}N_2O_3S$ | 59.19 | 59.12 | 5.29 | 5.34 | 9.20 | 9.10 | 10.53 | 10.25 |
| 2 | N,N-Dimethyl-o-toluidine | 132–133.5 | $C_{16}H_{18}N_2O_3S$ | 60.36 | 60.56 | 5.69 | 5.88 | 8.82 | 8.89 | 10.07 | 9.87 |
| 3 | N,N-Dimethyl-m-toluidine | 94–96 | $C_{16}H_{18}N_2O_3S$ | 60.36 | 60.35 | 5.69 | 5.81 | 8.82 | 8.70 | 10.07 | 10.10 |
| 4 | N,N-Dimethyl-p-toluidine | 121–122 | $C_{16}H_{18}N_2O_3S$ | 60.36 | 60.30 | 5.69 | 5.78 | 8.82 | 8.75 | 10.07 | 10.15 |
| 5 | p-Methoxy-N,N-Dimethylaniline | 89–91 | $C_{16}H_{18}N_2O_4S$ | | | | | 8.37 | 8.10 | 9.59 | 9.41 |
| 6 | 2,5-Dimethoxy-N,N-Dimethylaniline | 133–134 | $C_{17}H_{20}N_2O_5S$ | | | | | 7.68 | 7.37 | 8.79 | 8.52 |

*All melting points are uncorrected.
**By microanalyses.

Butyl methacrylate under similar conditions also gave a fully polymerized mass which was bubble free.

EXAMPLE 7

To 10 grams of acrylonitrile in a test tube was added 0.6 gram of the salt of dimethylaniline and saccharin. The tube was sealed and on polymerization at 60° C. for one hour, the polymer was precipitated in methanol and weighed 1.8 grams.

EXAMPLE 8

To 10 grams of methyl acrylate in a test tube was added 0.35 gram of the salt of dimethylaniline and saccharin. The experiment was repeated as in Example 8 to give 8.1 grams of the polymer.

EXAMPLE 9

The rate of polymerization of 10 ml. of methyl methacrylate by 0.304 g. of the salt of dimethylaniline and saccharin was studied at 60° C. by removing tubes at various intervals of times and precipitating the polymer in methanol and drying. The results obtained are shown in Table II.

*Table II*

| No. | Time in Minutes | Amount of Polymer in Grams |
|---|---|---|
| 1 | 30 | 0.20 |
| 2 | 60 | 0.74 |
| 3 | 90 | 1.24 |
| 4 | 120 | 1.78 |
| 5 | 150 | 2.56 |

EXAMPLE 10

Finely ground polymethyl methacrylate was mixed thoroughly with 2 percent by weight of benzoyl peroxide. Two grams of the resulting powder were thoroughly mixed with 1 ml. of activated methyl methacrylate. The activated methyl methacrylate was obtained by dissolving 0.95 g. of the salt of dimethyl-p-toluidine and saccharin in 100 ml. of methyl methacrylate. The slurry or the dough obtained by mixing the polymer with the activated monomer polymerized to a very hard mass in 4–5 minutes. A considerable amount of heat was evolved.

EXAMPLE 11

The experiment in Example 10 was repeated except that the activated methyl methacrylate was obtained by dissolving 1 gram of the salt of dimethylaniline and saccharin in 100 ml. of methyl methacrylate.

The slurry obtained polymerized to a hard mass in 7–8 minutes with the evolution of heat.

EXAMPLE 12

One hundred grams of fine suspension copolymer containing 75 percent methyl methacrylate and 25 percent ethyl methacrylate were thoroughly mixed with 2 grams of p-chlorobenzoyl peroxide. Two grams of this powder were mixed with 1 ml. of activated ethyl methacrylate which had been prepared by dissolving 0.9 gram of the saccharin salt of p-methoxy-N,N-dimethylaniline in 100 ml. of ethyl methacrylate. The polymer-monomer mixture polymerized in 5–6 minutes to a hard mass with the evolution of heat.

EXAMPLE 13

The experiment in Example 12 was repeated except that the copolymer employed contained 77 percent methyl methacrylate, 20 percent acrylonitrile and 3 percent methacrylic acid.

The polymer-monomer dough polymerized in 5–6 minutes to a hard mass.

EXAMPLE 14

In a polymerization kettle, 750 ml. of distilled water and 6 grams of soluble starch were stirred with a stirrer at 1600 R. P. M. The contents of the kettle were heated to 80° C. Three hundred grams of inhibitor-free methyl methacrylate monomer containing 3 grams of the salt of N,N-dimethyl-p-toluidine and saccharin dissolved therein were added to the kettle and polymerization carried out by bubbling nitrogen through the kettle. The kettle was stirred continuously and the temperature in the kettle was maintained at about 80° C. At the end of 6 hours, the suspension polymer was separated, washed thoroughly with water and dried. It weighed 180 grams.

EXAMPLE 15

A mixture of 200 grams of methyl methacrylate and 100 grams of styrene was polymerized as in Example 14 to produce 170 grams of the dried copolymer methacrylate styrene.

EXAMPLE 16

A mixture of 200 grams of methyl methacrylate, 50 grams of acrylonitrile and 50 grams of styrene were polymerized as in Example 14 to give 185 grams of the dried copolymer of methyl methacrylate, acrylonitrile and styrene.

EXAMPLE 17

Using the polymerized procedure as set forth in Example 1, the polymerization of methyl methacrylate was carried out at 60° C. using mixtures of the specified tertiary aromatic amines and saccharin and using the saccharin salts. The data is summarized in Table III.

From the table, a surprising molecular weight difference was found between the use of the preformed salt and from the use of the mixture of the tertiary amine and saccharin. In substantially every case which has been tried, the foregoing specific compounds being merely exemplary, the average weight of the polymer produced, that is the yield, was substantially higher during a unit period of time using the mixture for polymerization, the unit of time being the unit of one hour, than when the preformed salt was used as the catalyst.

*Table III*

POLYMERIZATION OF METHYL METHACRYLATE AT 60° C. BY SALTS OR MIXTURES OF N,N-DIMETHYL ARYL AMINE AND SACCHARIN

[0.0010 mole of salt or mixture of 0.0010 mole each of amine and saccharin was used for polymerizing 10 ml. of methyl methacrylate.]

| No. | Catalyst | Average weight of polymer |
|---|---|---|
| 1 | Salt of N,N-dimethylaniline and saccharin | 6.53±0.15 |
| 2 | Mixture of N,N-dimethylaniline and saccharin | 10.38±0.25 |
| 3 | Salt of N,N-dimethyl-p-toluidine | 13.47±0.50 |
| 4 | Mixture of N,N-dimethyl-p-toluidine | 20.60±0.40 |
| 5 | Salt of N,N-dimethyl-m-toluidine | 8.18±0.35 |
| 6 | Mixture of N,N-dimethyl-m-toluidine | 13.80±0.30 |

EXAMPLE 18

Using the same technique as in Example 17, and during a polymerization period of one hour, the yield figures were obtained as set forth in Table IV.

The table shows the remarkable specificity of the tertiary aromatic amines in admixture with saccharin for acrylic polymerization. In particular it is surprising that amine #5 of the table, the dihydroxy ethyl derivative of aniline should produce such an excellent yield in the one hour run if one considers that it is not possible to isolate the salt of this amine with saccharin in suitable crystalline form.

Table IV

POLYMERIZATION OF METHYL METHACRYLATE AT 60° C. BY VARIOUS MIXTURES OF AMINES AND O-BENZOIC SULFIMIDE (SACCHARIN)

[0.0010 mole each of amine and o-benzoic sulfimide were used for polymerization of 10 ml. of methyl methacrylate.]

| No. | Name of amine used in admixture with o-benzoic sulfimide | Average weight of polymer×10 |
|---|---|---|
| 1 | Aniline | No polymerization. |
| 2 | N-Methylaniline | Do. |
| 3 | N,N-Dimethylaniline | 10.23±0.25. |
| 4 | N,N-Diethylaniline | 9.60±0.20. |
| 5 | N,N-Di-B-hydroxyethylaniline | 10.20±0.02. |
| 6 | N,N-Dipropylaniline | 4.13±0.27. |
| 7 | N,N-Dimethyl-o-toluidine | 4.35±0.07. |
| 8 | N,N-Dimethyl-m-toluidine | 13.80±0.30. |
| 9 | N,N-Dimethyl-p-toluidine | 20.60±0.40. |
| 10 | N,N-Dimethyl-p-anisidine | 17.49±0.43. |
| 11 | N,N-Diethyl-m-toluidine | 5.31±0.47. |
| 12 | p-Bromo-N,N-dimethylaniline | 6.52±0.27. |
| 13 | p-Bromo-N,N-diethylaniline | 4.25±0.13. |
| 14 | p-Chloro-N,N-diethylaniline | 2.12±0.09. |
| 15 | N,N-Dimethylamino-p-benzaldehyde | 2.72±0.10. |
| 16 | N,N-Dimethyl-p-nitroaniline | No polymerization. |
| 17 | N,N-Dimethyl-p-nitrosoaniline | Do. |
| 18 | N,N-Dimethyl-p-phenylazoaniline | Do. |
| 19 | N,N-Diethylcyclohexylamine | Do. |
| 20 | Quinoline | Do. |
| 21 | N,N-Dimethylbenzylamine | Do. |
| 22 | tri-n-Butylamine | Do. |
| 23 | N-Methylmorpholine | Do. |

EXAMPLE 19

Mixtures of N,N-dimethylaniline and saccharin are used for the polymerization of methyl methacrylate at 60° C. and the amount of polymer produced during uniform time intervals is summarized in Table V.

In Table V the comparison is made between the effectiveness of the preformed salt as the catalyst and the mixture as the catalyst. Remarkably, the mixture is far more effective for unit of time and continues to be effective to produce highly satisfactory conversions of monomer into polymer. The data obtained in this run is of value in following the course of the reaction and in specifying the necessary conditions for producing the polymer on a satisfactory commercial basis.

The same difference in effectiveness of the mixture as compared with the pre-formed salt at polymerizing acrylic monomers holds true in favor of the greater effectiveness of the mixture with monomers other than methyl methacrylate, such monomers as acrylate monomers, acrylic acid monomers, acrylonitrile monomers and the like and holds true with other tertiary carbocyclic aromatic amines. In fact, with respect to N-dihydroxy alkyl amines of aniline or naphthylamines, the salts are not isolable but the mixtures are nevertheless highly effective catalytically.

Table V

POLYMERIZATION OF METHYL METHACRYLATE AT 60° C. FOR 1 HOUR BY SALT OR EQUIMOLAR MIXTURE OF N,N-DIMETHYLANILINE AND O-BENZOIC SULFIMIDE

[0.001 mole each of N,N-dimethylaniline and o-benzoic sulfimide or 0.001 mole of the corresponding salt was used per 10 ml. of monomer.]

| Time in Minutes | Mixture as Catalyst Amount of Polymer×10 | Salt as catalyst Amount of Polymer×10 |
|---|---|---|
| 15 | 2.41±0.09 | Trace |
| 30 | 5.73±0.12 | 1.83±0.02 |
| 60 | 11.48±0.10 | 7.37±0.11 |
| 90 | 17.58±0.25 | 12.34±0.21 |
| 120 | 23.49±0.06 | 17.80±0.25 |
| 150 | 32.57±0.14 | 25.67±0.32 |

In the foregoing table the use of 0.001 mol is merely exemplary and the same general effect of the mixtures versus the pre-formed salts as catalysts is shown with higher concentrations of the catalyst.

EXAMPLE 20

In this example the technique of Example 1 is followed and methyl methacrylate is polymerized by mixtures of N,N-dimethylaniline and the specified carboxylic acid.

The data shows that the catalytic effect of the tertiary amine is found with carboxylic acids which are strongly activated in addition to the catalytic effect observed with saccharin. Remarkably, monochloroacetic acid compound No. 5 in Table VI produces an extremely high molecular weight. Compound No. 4, phenoxyacetic acid also produces an extremely high molecular weight. Dichlor and trichlor acetic acids produce molecular weights which are almost double that of the molecular weight of the saccharin salts. This property of producing polymers of extremely high molecular weight is a very valuable property which can be applied in the preparation of tailored polymer mixtures.

The high molecular weight methacrylate polymers have improved physical properties and can be used to produce desirable surface effects in coating, laminating and similar applications in order to improve commercial materials.

The catalytic effect with mixtures of the chloro substituted or mercapto substituted acetic acids in Table VI is exemplary of the effect which can be achieved with lower water soluble aliphatic carboxylic acids, such as propionic acid, mono, di and tri-chloro substituted at the alpha carbon atom, and isobutyric acid substituted in the same manner. Other halogens may be used as the substituents, such as bromine or iodine but chlorine is preferred because it is more readily available.

Table VI

POLYMERIZATION OF METHYL METHACRYLATE AT 60° C. BY VARIOUS MIXTURES OF N,N-DIMETHYLANILINE AND CARBOXYLIC ACIDS

[0.0015 mole each of N,N-dimethylaniline and carboxylic acid used for polymerization of methyl methacrylate.]

| No. | Name of carboxylic acid used in admixture with N,N-dimethylaniline | Av. Wt. of Polymer×10 | Mol. Weight (Viscosity) Method) |
|---|---|---|---|
| 1 | Acetic acid | No polymerization | |
| 2 | Mercaptoacetic acid | 1.34±0.11 | 40,000 |
| 3 | Methoxyacetic acid | Traces | |
| 4 | Phenoxyacetic acid | 3.98±0.07 | 1,360,000 |
| 5 | Monochloroacetic acid | 1.60±0.11 | 2,160,000 |
| 6 | Dichloroacetic acid | 6.70±0.06 | 725,000 |
| 7 | Trichloroacetic acid | 9.45±0.03 | 610,000 |
| 7A | Trichloroacetic acid (in the absence of N,N-dimethylaniline). | No polymerization | |
| 8 | Benzoic acid | do | |
| 9 | 2,4-Dichlorobenzoic acid | 1.20±0.01 | |
| 10 | Mixture of 0.0015 mole each of N,N-dimethylaniline and O-benzoic sulfimide. | 17.90±0.25 | 380,000 |

As can be seen from the above Table VI, activation of polymerization is achieved by using a water-soluble carboxylic acid in admixture with the aromatic tertiary amine, the carboxylic acid being activated at the alpha carbon atom with an electronegative substituent such as a halogen, phenyl or aryloxy substituent.

EXAMPLE 21

A mixture of N,N-dimethyl-1-naphthylamine and saccharin polymerizes methyl methacrylate in a sealed tube at 60° C. N,N-dimethyl-2-naphthylamine behaves likewise.

To 0.171 gram of N,N-dimethyl-1-naphthylamine and 0.183 gram of saccharin contained in a 25 ml. test tube was added 10 ml. of distilled methyl methacrylate. The tube was carefully sealed without flushing the tube with nitrogen. The tube was suspended in water bath at 60° C. After two hours, the monomer was almost completely polymerized and was free of bubbles.

EXAMPLE 22

The run in Example 21 was repeated using the following catalytic mixtures. In each case, 10 ml. of methyl methacrylate was used.

A. 0.171 gram of N,N-dimethyl-2-naphthylamine and 0.183 gram of saccharin
B. 0.2 gram of N,N-diethyl-1-naphthylamine and 0.183 gram of saccharin
C. 0.2 gram of N,N-diethyl-2-naphthylamine and 0.183 gram of saccharin After two to three hours of polymerization in a sealed tube at 60° C., clear bubble-free polymeric masses were obtained in each of A, B and C.

It will be noted in these examples that it is not necessary to have a nitrogen or other inert atmosphere.

In the foregoing examples, bulk polymerization is illustrated in Examples 6–14 whereas aqueous suspension polymerization is illustrated in Examples 15–17. Equally good results are obtained in the bulk polymerization examples, Examples 6–14, if the polymerization is carried out in the presence of an inert organic solvent from which the polymer precipitates or in which the polymer is suspended in an insoluble form. Thus, one may use petroleum naphtha, xylene or the like.

Examples 15–17 directed to aqueous suspension polymerization are illustrative of a base recipe for carrying out the new polymerization method of the present invention. Wetting agents, including anionic wetting agents, cationic wetting agents, non-ionic wetting agents as well as compatible emulsifiers as shown in Kropa Patent U. S. 2,473,801, June 21, 1949, may be added to promote the suspension of the finely divided polymer particles.

The saccharin amine salts of the present invention are useful for graft or block polymerization processes in which an acrylic monomer is drafted into a pre-formed polymer such as an acrylic polymer or copolymer or a styrene polymer. The technique of graft polymerization is known in accordance with the work of a G. Smets and M. Claesen in the "Journal of Polymer Science," volume 8, page 289, 1952.

Due to the water solubility of the saccharin amine mixture or salt catalyst, the processes of Examples 15 through 17 may be carried out under the conditions therein described to produce a pre-formed acrylic or styrene polymer or copolymer and thereupon the process is interrupted to introduce a small amount of monomer in the polymerization kettle whereby this monomer is effectively grafted onto the pre-formed polymer.

Where the pre-formed polymer is a polymer of acrylic ester such as methyl methacrylate or of a styrene copolymer as in Examples 16 and 17, the grafting of an acrylic acid monomer can modify the surface of the polymer substrate to produce products having a slight solubility in dilute aqueous alkali due to the formation of a water soluble salt at the graft interface.

A further embodiment in the process may be realized if the pre-formed polymer is one produced through conventional peroxide polymerization. In such polymerization using up to about 1.5% of benzoyl peroxide as an example of a peroxide catalyst, the polymer beads contain appreciable although small quantities of peroxide which is catalytically synergistic with the saccharin amine catalyst of the present invention.

The amount of peroxide catalyst required for conventional polymerization is materially reduced when the saccharin amine catalyst of the present invention is incorporated in an effective amount of from 0.5 to 1.5 mole percent of monomer under a nitrogen atmosphere. The amount of residual peroxide in commercial bead acrylic polymer is ordinarily insufficient to induce low temperature polymerization catalysis in bulk (below 50° C.) of the polymerization of monomer added thereto. Surprisingly, the addition of the saccharin amine salt to such bead polymer containing residual peroxide (peroxide content about 0.01–0.08%) produces a catalytic effect on polymerization which is even greater than that exhibited upon the addition of the same quantity of saccharin amine salt to the peroxide free bead polymer in the presence of the same amount of acrylic monomer, methyl methacrylate monomer.

In understanding the catalytic effect of the present invention, it is helpful to distinguish the polymerization process of the invention from the polymerization processes which have been described in the prior art utilizing tertiary amines, particularly aromatic amines as promoters of peroxide polymerization catalysis. Such amine promoters are not effective per se as catalysts whereas the present tertiary amine mixtures produce a successful polymerization in bulk or in an inert atmosphere.

Further, there have been used amine salts of sulfinic acids such as toluene sulfinic acid and as described in British Patent 710,535.

It is noteworthy that the amines forming salts with toluene sulfinic acids are not tertiary amines but rather are primary or secondary amines and, accordingly, are reactive at the acidic hydrogen atom attached to the amino nitrogen atom to be replaceable with metal salts and the like. Such reactivity is of course absent with the tertiary amine salts of the present invention. The sulfinic acid salts are entirely different structurally from the salts of saccharin since saccharin contains an ortho-sulfobenzimide group, a group replaced at the imide nitrogen with a tertiary amine of limited substitution as defined in the foregoing description to produce the catalytically effective salt of the present invention.

Although the structural distinctions which define the salts of the present invention over the prior art are clear, the mechanism of the catalytical activity for the polymerization of monomers is not too well understood. It is surprising that the activity persists over a wide temperature range varying from room temperature, about 15° C. to about 95° C. and that the activity is realized under an atmosphere of nitrogen.

It is further surprising that the catalyst activity appears to be directed towards acrylic monomers in particular and such activity is not found at a practical level in attempts to polymerize such vinyl monomers as vinyl acetate or styrene. Although the vinyl monomers may not be polymerized by the present catalyst, interpolymers and copolymers of these may be produced in accordance with the present invention if an appreciable amount of acrylic monomer is present, such amount being of the order of about 20%, depending upon the constitution of the copolymer. Examples 15–17 illustrate typical copolymers which may be produced exclusively by the catalyst of the present invention exclusive of the peroxide catalyst.

The saccharin amine salts of the present invention may be used for other purposes.

Saccharin-dimethylaniline salt gives deep yellow color with anhydrides such as maleic anhydride or phthalic anhydride. Thus it may be used for detecting any free anhydride in polyesters prepared from maleic or phthalic anhydride.

A further use of the saccharin salts or the saccharin amine mixtures or the catalytic carboxy acid tertiary aromatic amine mixtures of the present invention lies in the control of the oil phase gelling of alkyd resins. Upon the addition, amounts varying from 0.01% to about 1.5% based upon the weight of the resin present, the salts mixtures and mixtures of the present invention accelerate the gelling of alkyd resins which are in the oil soluble state. Specifically, alkyd resins resulting from the polymerization or co-polymerization of a modified or unmodified polyhydric alcohol ester of an unsaturated polycarboxylic acid and at least one organic substance which contains the polymerizably reactive group $$CH_2=C<$$

and/or contains the allyl or methallyl group of the following general structure

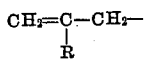

where R is hydrogen or a simple alkyl radical.

In the presence of a peroxide catalyst not only is acrylic polymerization accelerated by the catalyst of the invention but the liquid resin product is gelled in the course of a few hours or less with the addition of the materials of the invention whereas in the absence of such materials the liquid resin product may remain liquid for days or weeks. Such control is highly advantageous in the preparation of mixed resins and is particularly of interest where one of the components in the mixed resin is an acrylic monomer polymerized in situ by the catalyst of the present invention which has the two separate capacities as a gelling category and as a polymerization catalyst.

Mixtures of tertiary aromatic amine and saccharin need not be in equimolar proportions. Increasing the amount of saccharin beyond this proportion increases the rate of polymerization of methyl methacrylate. Greater amount of amine than that required by equimolar proportion requirement may also be used; however, the rate of polymerization is not significantly increased.

In suspension polymerizations utilizing the saccharin amine salt catalyst of the present invention, the use of small quantities (0.01–0.1% by weight of the system) of known finely divided inorganic suspension stabilizers such as alumina, talc, barium sulfate, kaolin, aluminum hydroxide or tricalcium phosphate is of benefit in producing pearls 2 to 3 mm. in diameter.

Having thus disclosed the invention I claim as my invention:

1. A method of polymerizing an acrylic ester monomer comprising treating said acrylic monomer with from 0.1 to 5.0 mol percent based on the weight of said monomer of a polymerization catalyst consisting of a member of the group consisting of (1) an N-salt of saccharin with an N,N-dialkyl aryl amine and (2) a mixture of a water-soluble organic carboxylic acid activated at the alpha carbon atom with an electronegative substituent selected from the group consisting of halogen, phenyl and aryloxy substituents and an N,N-dialkyl aryl amine, the mol ratio of said carboxylic acid to said last named aryl amine varying from about 0.8 to 1.3.

2. A process as in claim 1 wherein said polymerization is carried out at room temperature in the presence of a pre-formed acrylic polymer.

3. A process as claimed in claim 1 wherein said carboxylic acid derivative is a chloracetic acid.

4. A process as claimed in claim 2 wherein said pre-formed polymer contains residual peroxide catalyst.

5. A process as claimed in claim 2 wherein said monomer is a lower alkyl ester of acrylic acid.

6. A process as claimed in claim 4 wherein said monomer is methyl methacrylate and said polymer is methyl methacrylate polymer.

7. A process as claimed in claim 5 wherein said monomer is grafted on to said pre-formed polymer in an aqueous polymerization medium.

8. A method of polymerizing an acrylic ester monomer comprising treating said acrylic monomer with from 0.1 to 5.0 mole percent based on the weight of said monomer of a polymerization catalyst consisting of a mixture of saccharin and an N,N-dialkyl aryl amine, the mol ratio of saccharin to amine varying from about 0.8 to 1.3.

9. A process as claimed in claim 8 wherein said catalyst is a mixture of di-hydroxyethylaniline and saccharin.

10. A process as claimed in claim 8 wherein said catalyst is a mixture of dimethyl toluidine and saccharin.

11. A method of polymerizing acrylic monomers comprising treating said acrylic monomer with from 0.1 to 5.0 mole percent based on the weight of said monomer of a polymerization catalyst consisting of a mixture of saccharin and N,N-dimethyl 2 naphthylamine.

12. A method of polymerizing an acrylic ester monomer comprising treating said acrylic monomer with from 0.1 to 5.0 mole percent based on the weight of said monomer of a polymerization catalyst consisting of the N-saccharin salt of N,N-dimethyl toluidine.

References Cited in the file of this patent
UNITED STATES PATENTS

| | | |
|---|---|---|
| 2,558,139 | Knock | June 26, 1951 |
| 2,567,803 | Costom et al. | Sept. 11, 1951 |
| 2,647,878 | Lee | Aug. 4, 1953 |
| 2,664,416 | Park | Dec. 29, 1953 |

FOREIGN PATENTS

| | | |
|---|---|---|
| 890,289 | France | Jan. 21, 1943 |

OTHER REFERENCES

Mameli: Chem. Abstracts, vol. 29, p. 3996 (1935).